३,४६०,१९७
SECTIONAL TIRE MOLD MECHANISM
Armindo Cantarutti, Akron, and Stephen F. Breza, Cuyahoga Falls, Ohio, assignors to NRM Corporation, Akron, Ohio, a corporation of Ohio
Filed July 13, 1966, Ser. No. 564,829
Int. Cl. B29h *17/00, 5/02*
U.S. Cl. 18—2                                  7 Claims

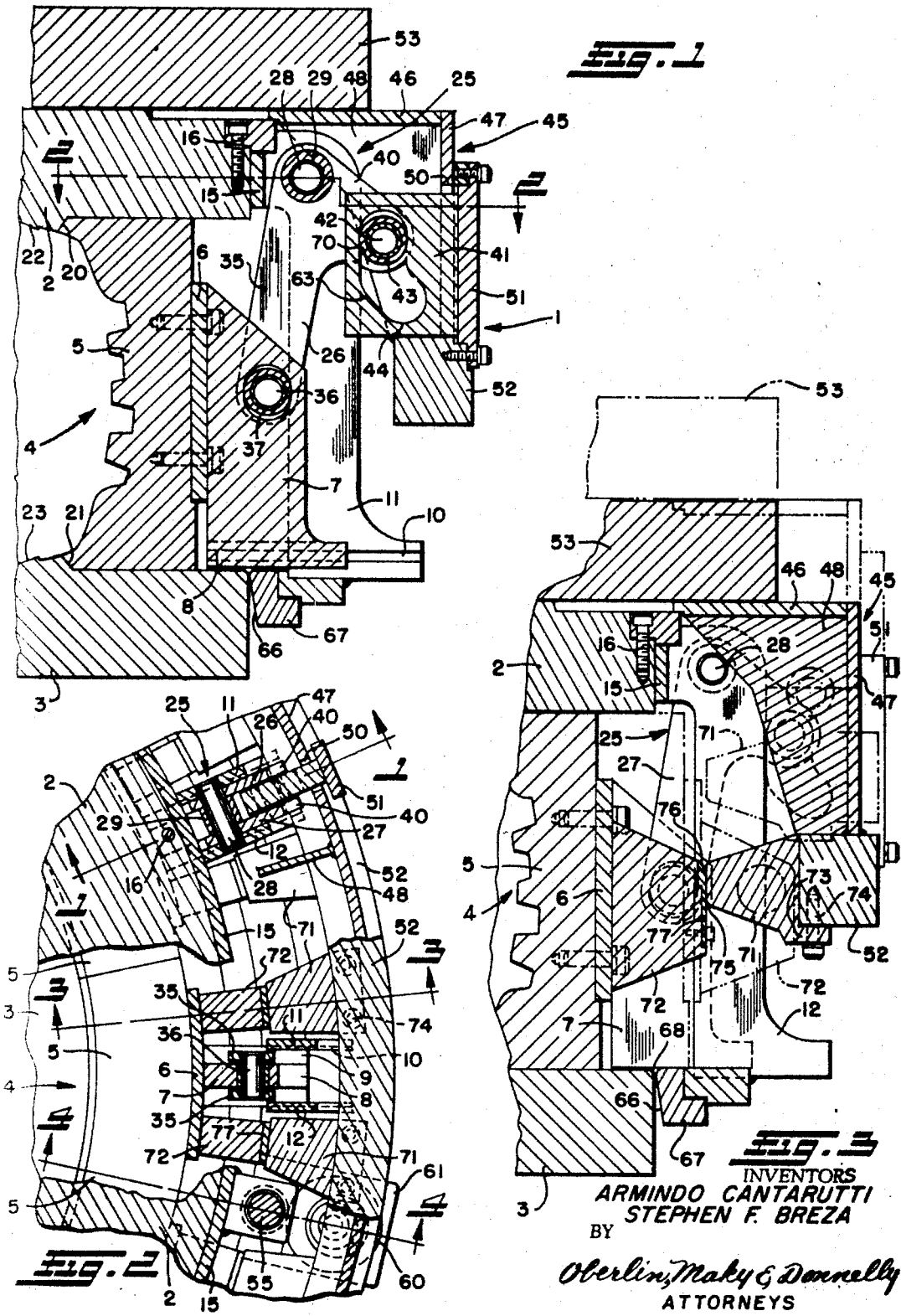

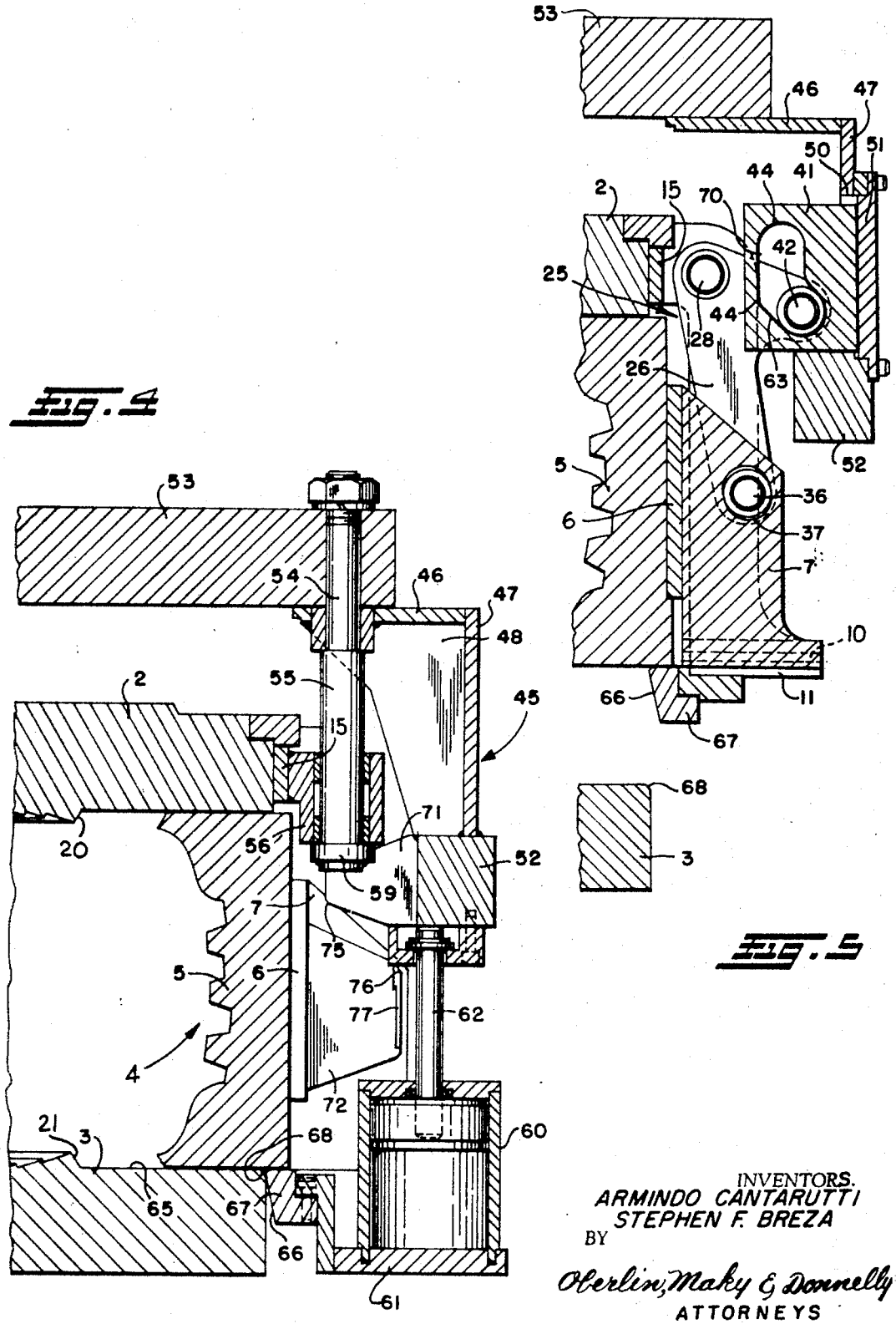

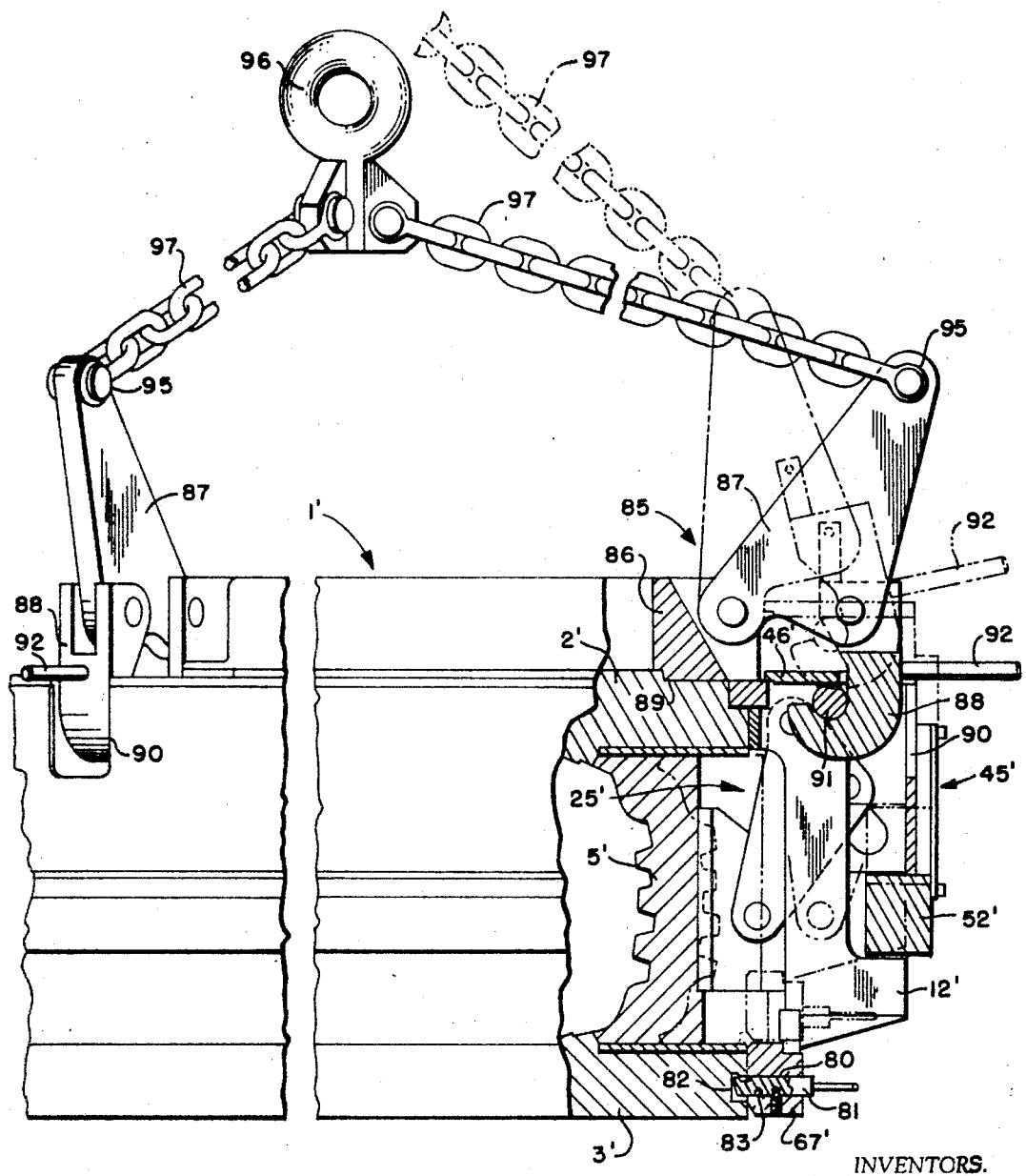

ABSTRACT OF THE DISCLOSURE

A sectional mold mechanism including an upper side wall mold section movable toward and away from a lower side wall mold section for closing and opening of said mold sections, and a plurality of tread mold sectors carried by said upper mold section for radial inward movement between the closed mold sections upon actuation of a plurality of linkages by cams having closed cam tracks movable relative to the upper mold sections subsequent to the closing of the mold sections. A lifting device may be used to transport the sectional mold mechanism from one position to another upon latching the mold sections together and connecting the lifting device to an annular housing for the closed cam tracks which when lifted causes radial outward movement of the tread sectors prior to lifting of the mold sections.

---

This invention relates generally, as indicated, to a sectional mold mechanism and more particularly to certain improvements in sectional mold mechanisms for use in connection with presses or pot-heaters for curing of standard or large size "off-the-road" tires.

Sectional mold mechanisms of the type shown and described in the copending applications of Armindo Cantarutti, Ser. No. 670,805, filed Sept. 26, 1967, which is a continuation of Ser. No. 399,543, filed Sept. 28, 1964, now abandoned, and of Leonard G. Turk et al., Ser. No. 496,-930, filed Oct. 18, 1965 all of which are commonly assigned, including upper and lower side wall mold sections and an intermediate tread portion consisting of a plurality of radially movable tread sectors have proven to be quite effective especially for vulcanizing radial band tires. Each tread sector is actuated by a pivoted linkage upon engagement of the linkage with one or the other of double cam surfaces carried by a bolster plate during movement of the bolster plate toward and away from the upper side wall mold section. However, prior to such engagement, misalignment of the linkage and cams may occur, whereby actuation of the tread sectors may be precluded. It is accordingly a principal object of this invention to provide a sectional mold mechanism of the type described, but with a unique cam track for positively locating the tread sector actuating linkages in all positions of the linkages.

Another object is to provide such a sectional mold mechanism in which the linkages for each tread sector are pivoted to the upper side wall mold section and the cam track is carried by an annular housing for relative movement toward and away from such upper side wall mold section.

Still another object is to provide such a sectional mold mechanism with a ring attached to the annular housing operative to lock the tread sectors in proper registry with the upper and lower side wall mold sections and become stressed during relative movement of the annular housing toward the upper mold section.

A further object is to provide such a sectional mold mechanism with novel guide means for maintaining the proper relationship between such annular housing and upper side wall mold section.

A still further object is to provide for positive concentricity of the upper and lower side wall mold sections and thus the bead rings secured to the interior edges thereof prior to the closing of the radial mold sectors.

Another object is to provide in combination with a sectional mold mechanism of the type described a unique lifting device for breaking open the mold mechanism during lifting out of a pot-heater or the like, and novel means for releasably latching such upper and lower side wall mold sections together.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

In such annexed drawing:

FIG. 1 is a fragmentary vertical section of a preferred form of sectional mold mechanism in accordance with this invention, showing the upper and lower side wall mold sections and intermediate tread sectors in the fully closed position in proper registry with each other;

FIG. 2 is a fragmentary horizontal section taken on the plane of the line 2—2 of FIG. 1, partially broken away to show the pin connection between the linkages and tread sectors actuated thereby;

FIG. 3 is a fragmentary vertical section through the tread sector locking and ring stressing mechanism, taken on the plane of the line 3—3, FIG. 2;

FIG. 4 is a fragmentary vertical section taken on the plane of the line 4—4 of FIG. 2, illustrating the guide pins and air cylinder for the annular housing;

FIG. 5 is a fragmentary vertical section similar to FIG. 1, but illustrating the sectional mold mechanism in the open position; and FIG. 6 is a fragmentary side elevation view of another form of sectional mold mechanism in accordance with this invention, partially broken away to show the manner of attachment of a lifting device to the mold mechanism for breaking open the mold mechanism during lifting out of a pot-heater.

Referring now in detail to the drawing and first especially to FIGS. 1–5, a preferred form of sectional mold mechanism in accordance with this invention for use with a conventional type press is generally indicated at 1 and includes opposed upper and lower side wall mold sections 2 and 3 and an intermediate tread section 4 consisting of a plurality of radially movable tread sectors 5 disposed between the upper and lower mold sections. Each tread sector 5 has a mounting plate 6 bolted or otherwise secured to the back side thereof to which there is attached a central projection 7 having a bottom horizontal portion 8 with horizontal tongues 9 extending outwardly from the ends thereof for receipt in grooves 10 formed in the inner faces of a pair of downwardly extending stanchions 11 and 12 carried by the upper side wall mold section 2, one on each side of the central projection 7. The stanchions 11 and 12 may be attached to the outer periphery of the upper mold section 2 through a ring 15 or the like secured to the mold seciton 2 by suitable fasteners 16. Accordingly, the tread sectors 5 will move with the upper mold section 2 during raising and lowering of the upper mold section 2 with respect to the lower mold section 3, in a manner and for a purpose to be fully explained hereafter.

The thread sectors 5 which may be of identical form are mounted for radial movement into and out of engagement with frusto-conical seats 20 and 21 provided on the respective mold sections 2 and 3 adjacent the outer edges of their mold surfaces 22 and 23 through actuation of a plurality of linkage assemblies 25, each of which includes a pair of parallel bellcranks 26, 27 pivoted between the upper ends of the stanchions 11, 12 by a pin 28 extending through aligned apertures in such stanchions 11, 12 and bell cranks 26, 27. A spacer 29 may be disposed about the pins 28 between the stanchions 11, 12. One arm 35 of each bellcrank 26, 27 extends along opposite sides of a central projection 7, and there is a pin 36 extending through a vertical slot 37 in the central projection 7 having its opposite ends received in aligned apertures in such arms 35. The other arms 40 of the bellcranks 26, 27 are connected to a cam block 41 by still another pin 42 having a spacer 43 surrounding the pin 42 and received in a cam track 44 formed in the cam blocks 41 with the ends of the pin 42 received in aligned openings in the arms 40.

The cam blocks 41 are carried by an annular housing 45 surrounding the upper mold section 2 and mounted for vertical movement toward and away therefrom. Such annular housing 45 consists of a top wall 46 which is adapted to be brought into engagement with the upper mold ring 15 and a cylindrical side wall 47 depending downwardly from the outer periphery of the top wall 46 with a plurality of circumferentially spaced stiffening ribs 48 between the top and side walls. The cam blocks 41 project inwardly through slots 50 in the side wall 47 in line with each of the central projections 7, and are provided with transverse end plates 51 adjacent the outer surface of the side wall 47 for securing of the cam blocks 41 by suitable fasteners to the side wall and a ring 52 attached to the bottom edge of such side wall.

The annular housing 45 is adapted to be attached to a press head 53 for limited vertical movement toward and away from the upper mold section 2. For that purpose, there is provided a plurality of tie rods 54 (see FIG. 4) for securing the annular housing 45 to the press head 53, and enlarged extensions 55 on the lower ends of the tie rods 54 in the form of guide posts which project through apertures in guide blocks 56 attached to the upper mold section 2 for maintaining the desired relation between the upper mold section and annular housing 45 during such relative movement therebetween. A stop 59 on the guide posts 54 limits the amount of permissible separation between the upper mold section 2 and annular housing 45, and air cylinders 60 or the like supported on an annular plate 61 attached to the lower ends of the stanchions 11, 12 with their piston rods 62 engaging the underside of the ring 52 yieldably maintain such annular housing 45 and upper mold section 2 in the separated condition, as illustrated in FIGS. 4 and 5.

When the annular housing 45 and upper mold section 2 are vertically spaced as aforesaid, the bellcranks 26, 27 of the linkage assemblies 25 are pivoted by the outwardly and downwardly inclined portions 63 of the cam track 44 to cause the tread sectors 5 to move radially outwardly. Conversely, when the annular housing 45 is descended toward the upper mold section 2, the bellcranks 26, 27 are pivoted by the track portion 63 in the reverse direction to effect radial inward movement of the tread sectors 5. However, before such vertical movement of the annular housing 45 toward the upper mold section 2 can occur, the bias of the air cylinders 60 must be overcome through engagement of the tread sectors 5 with the planar surface 65 of the lower mold section 3 after the mold sections 2 and 3 have been brought into proper registry by the pilot surface 66 of a registry ring 67 carried by the stanchions 11, 12 contacting the tapered edge 68 of the lower mold section 3.

In addition to the lower inclined portion 63, the cam tracks 44 are provided with a vertical portion 70 which permits the press to be closed fully after the tread sectors 5 have been moved radially inwardly against the seats 20 and 21 of the upper and lower mold sections 2 and 3. It is to be noted, however, that at no time during opening or closing of the press is there disengagement of the linkage assemblies 25 from the cam tracks 44. Accordingly, the linkage assemblies 25 are always positively guided by the cam tracks 44, thus eliminating any possibility of misalignment therebetween.

To assure firm seating engagement of the tread sectors 5 against the seats 20, 21 during the tire vulcanizing operation, a pair of outer bearing blocks 71 is secured to the ring 52 straddling each pair of stanchions 11, 12 which press against similar inner bearing blocks 72 projecting outwardly from the mounting plates 6. The bearing blocks 71 may be provided with a bottom flange 73 which fits beneath the ring 52 through which fasteners 74 extend for attaching the blocks 71 to the ring 52, and tapered outwardly and provided with a lower cam surface 75 which is adapted to cooperate with a pilot surface 76 on hardened wear plates 77 attached to the bearing blocks 72 to facilitate overlapping of the blocks 71, 72. Actually, as the outer bearing blocks are cammed over the inner bearing blocks 72, the ring 52 is stressed to an extent sufficient to create a circumferential centripetal force equal to or greater than the radial outward forces caused by the high pressures generated within the mold chamber during the entire vulcanizing operation.

In use, the lower side wall mold section 3 of the sectional mold mechanism 1 is mounted on the stationary bottom portion of a conventional type press, not shown, and the annular housing 45 attached to the press head 53. Initially, the press head 53 is moved upwardly and preferably laterally to clear the lower mold section 3 for overhead loading of the green tire or carcass, after which a diaphragm or the like (not shown) may be expanded into the green tire to hold the same in place as the press is closed. In such up position, the annular housing 45 and upper mold section 2 are maintained in spaced apart relation by the air cylinders 60 with the tread sectors 5 in the retracted position for clearing of the tread section of the green tire during the initial descent of the press head 53.

After the mold sections 2 and 3 have been brought into proper registry so that the upper and lower side wall mold sections and thus the bead rings are concentric and the tread sectors 5 firmly seated against the planar surface 68 of the lower mold section 3, continued descent of the press head 53 causes the annular housing 45 to move downwardly toward the upper mold section 2, resulting in radial inward movement of the tread sectors 5 and locking of the tread sectors 5 in place by contact of the outer bearing blocks 71 with the inner bearing blocks 72.

Upon completion of the tire vulcanizing operation, the press may be opened by raising the press head 53. During the initial upward movement of the press head, the vertical portion 70 of the cam tracks 44 permits relative movement between the annular housing 45 and upper mold section 2 for disengagement of the outer and inner bearing blocks 71 and 72 and release of the high pressure exerted by the press against the sectional mold mechanism 1 prior to withdrawal of the tread sectors 5. When the bearing blocks 71 and 72 are clear of each other as illustrated in phantom lines in FIG. 3 and solid lines in FIG. 4, the inclined portion 63 of the cam tracks 44 causes the linkage assemblies 25 to be pivoted in a direction moving the tread sectors 5 radially outwardly to completely clear the outer periphery of the cured tire. Finally, the stops 59 engage the guide blocks 56 for lifting of the upper mold section 2 with the annular housing 45 to a position remote from the lower mold section 3 for stripping of the cured tire and loading of another green tire within the mold.

The sectional mold mechanism 1, although thus far described only for use with a tire curing press, may with slight modifications be adapted for pot-heater curing of large "off-the-road" tires, wherein the green tires are first shaped and curing medium containers such as water bags, steam bags, bladders or diaphragms inserted and then placed in mold mechanisms, after which the mold mechanisms are latched and a plurality of them lowered into a pot-heater for curing. Such a modified form of sectional mold mechanism is generally indicated at 1' in FIG. 6 with like parts being identified by the same reference numerals followed by a prime symbol (').

For locking together of the upper and lower mold sections 2' and 3' after the large green tires have been positioned in place in the molds to permit lowering into a pot-heater, not shown, the registry ring 67' carried by the stanchions 11', 12' is provided with an opening 80 in which there is mounted a latch mechanism 81 that is adapted to be moved into and out of a recess 82 in the lower mold section 3'. Ball detents 83 or the like may be provided for releasably holding the latch mechanism 81 in or out of the recess 82, as desired.

A lifting device 85 consisting of a ring 86 having pivoted thereto a plurality of circumferentially spaced lifting links 87, preferably three in number spaced 120° apart, with hooks 88 pivoted to the links 87 is provided for lowering and raising the sectional mold mechanisms 1' into and out of the pot-heater. The ring 86 is adapted to engage an annular step 89 on the upper surface of the upper mold section 2', and slots 90 are provided in the annular housing 45' into which the hooks 88 may be dropped for engaging rod-like elements 91 welded to the undersurface of the top wall 46'. Handles 92 may project outwardly from the hooks 88 for grasping by the operators to assist in positioning of the ring 86 against the annular step 89 and locating of the hooks 88 in the slots 90 in engagement with the elements 91.

The lifting links 87 each have a shackle 95 attached thereto for connecting the links to a lifting ring 96 or the like by chains 97. Accordingly, after the upper and lower mold sections are latched together, the sectional mold mechanisms may be dropped one at a time into the pot-heater by attaching the lifting device 85 to the sectional mold mechanism and attaching the lifting ring 96 to a crane or the like. Of course, once a mold mechanism 1' is in position in the pot-heater, the lifting device 85 is removed to permit stacking of other sectional mold mechanisms 1' thereon in the same manner. After placing the desired number of sectional mold mechanisms in the pot-heater, the pot-heater is closed by ram action within the pot-heater which in turn closes the mechanism as heretofore described in press operation and the tires are cured.

When the tire curing operation is complete, the lifting device 85 is again moved into position as shown in FIG. 6 and the mold mechanisms 1' are lifting out of the pot-heater, one at a time. During such lifting, the mold mechanisms 1' are broken open through pivoting of the lifting links 87 to the phantom line position illustrated in FIG. 6 because of the weight of the mold mechanisms, causing lifting of the annular housing 45' relative to the side wall mold sections and thus causing retraction of the tread sectors 5'. By continued lifting, the entire mold mechanism including the side wall mold sections, tread sectors, and annular housing are removed from the pot-heater as a unit, after which the latch mechanisms 81 may be released to permit separation of the upper mold section 2' and annular housing 45' from the lower mold section 3' for tire removal and replacement by another green tire.

From the above discussion, it can now be seen that the sectional mold mechanism of the present invention is of a unique and simple construction, including a novel cam arrangement for positively locating the tread mold sectors in all positions. The tread sector actuating cams are carried by an annular housing for relative vertical movement with respect to the upper mold section, and guide posts interconnect the annular housing and upper mold section for maintaining the proper relation therebetween during such relative movement.

Moreover, with slight modifications the sectional mold mechanism as described may be used for pot-heater curing of large "off-the-road" tires in addition to curing standard size tires, and for that purpose there is provided a novel lifting device for breaking open the mold mechanism through retraction of the tread sectors during lifting of the mold mechanism from the pot-heater, and novel latch means for holding the upper and lower side wall mold sections together during such lifting.

Other modes of applying the principles of the invention may be employed, change being made as regards the details described, provided the features stated in any of the following claims or the equivalent of such be employed.

We therefore, particularly point out and distinctly claim as our invention:

1. A sectional mold mechanism comprising a lower side wall mold section, an upper side wall mold section mounted for vertical movement toward and away from said lower side wall mold section for closing and opening of said side wall mold sections, a plurality of tread mold sectors mounted for radial inward movement between said mold sections to form therewith when closed a continuous annular tire mold, a plurality of pivoted linkage means connected to said tread mold sectors for effecting such radial inward movement of said tread mold sectors through pivoting of said linkage means, an annular housing surrounding said upper side wall mold section, and means mounting said annular housing and upper side wall mold section for relative vertical movement toward and away from said upper side wall mold section, a plurality of cam means mounted on said annular housing for vertical movement with said annular housing for effecting such pivotal movement of said linkage means, means associated with said upper side wall mold section for limiting the extent of movement of said annular housing away from said upper side wall mold section, means for releasably latching said side wall mold sections together, and lifting means engageable with said annular housing for lifting said annular housing relative to said side wall mold sections while said side wall mold sections are latched together to cause radial outward movement of said tread sectors by said cam means followed by lifting of said side wall mold sections, tread sectors, and annular housing as a unit.

2. The sectional mold mechanism of claim 1 wherein said means for releasably latching said side wall mold sections together comprises a latch mechanism carried by said upper side wall mold section for movement into and out of a recess in said lower side wall mold section, and ball detent means for releasably holding said latch mechanism in and out of said recess.

3. The sectional mold mechanism of claim 1 further comprising means for biasing said annular housing upwardly away from said upper side wall mold section.

4. The sectional mold mechanism of claim 3 wherein said cam means have closed cam tracks for positively locating said linkage means in all positions of said cam means, said closed cam tracks including an inclined portion for pivoting said linkage means during the initial movement of said cam means toward said upper side wall mold section to effect radial inward movement of said tread mold sectors into seating engagement with said side wall mold sections, and a vertical portion for retaining said tread mold sectors in such seating engagement with said side wall mold sections during further movement of said cam means toward said upper side wall mold sections for applying pressure to said side wall mold sections by said annular housing.

5. The sectional mold mechanism of claim 4 further comprising an annular ring supported by said annular housing for movement therewith, bearing blocks on said tread mold sectors, and corresponding bearing blocks on said ring adapted to engage said bearing blocks on said tread mold sectors during such further movement of said cam means toward said upper side wall section for locking of said tread mold sectors in such seating engagement with said side wall mold sections.

6. The sectional mold mechanism of claim 1 wherein said lifting means includes a ring engageable with said upper side wall mold section, a plurality of circumferentially spaced lifting links pivoted to said ring, and hooks pivoted to said links for hooking engagement with said annular housing.

7. The sectional mold mechanism of claim 6 wherein said annular housing is provided with circumferentially spaced slots for receipt of said hooks, and handles project from said links for grasping to assist in positioning said ring against said upper side wall mold section and locating said hooks in said slots.

References Cited

UNITED STATES PATENTS

| | | |
|---|---|---|
| 796,789 | 8/1905 | Adam. |
| 860,263 | 7/1907 | Stearns. |
| 1,179,898 | 4/1916 | Coffey et al. |
| 1,326,874 | 12/1919 | MacBeth et al. |
| 1,382,398 | 6/1921 | Wildroudt. |
| 1,388,255 | 8/1921 | Hardeman. |
| 1,389,442 | 8/1921 | De Mattia. |
| 1,517,850 | 12/1924 | Mathes. |
| 1,880,462 | 10/1932 | Mullin. |
| 1,924,018 | 8/1933 | Begley et al. |
| 1,960,427 | 5/1934 | Abbott. |
| 2,718,031 | 9/1955 | Harvey. |
| 2,996,760 | 8/1961 | Dennis et al. |
| 3,097,394 | 7/1963 | Mallory et al. |
| 3,287,486 | 11/1966 | Jurgeleit et al. |
| 3,337,918 | 8/1967 | Picciarini et al. |
| 3,358,330 | 12/1967 | Picciarini et al. |

J. HOWARD FLINT, Jr., Primary Examiner

U.S. Cl. X.R.

18—17, 42